United States Patent [19]

Bateman et al.

[11] 4,005,626
[45] Feb. 1, 1977

[54] MACHINE FOR INDEXING GROUPS OF NESTABLE TRIMMED ARTICLES IN A STACK

[75] Inventors: Allen H. Bateman, Chippewa Falls; Charles B. Case, Eau Claire; David W. Kragness, Colfax; Edward C. LeDuc, Chippewa Falls, all of Wis.

[73] Assignee: Standard Oil Company (Indiana), Chicago, Ill.

[22] Filed: Apr. 28, 1975

[21] Appl. No.: 572,219

[52] U.S. Cl. ............................ 83/238; 83/244; 83/278
[51] Int. Cl.² ........................................ B26D 7/06
[58] Field of Search ...... 83/55, 238, 239, 240–248, 83/278

[56] References Cited

UNITED STATES PATENTS

| 3,388,625 | 6/1968 | O'Brien et al. | 83/238 |
| 3,444,768 | 5/1969 | McGara et al. | 83/238 |
| 3,577,821 | 5/1971 | Medendorp | 83/238 |

*Primary Examiner*—Frank T. Yost
*Attorney, Agent, or Firm*—Stanley M. Welsh; Arthur G. Gilkes; William T. McClain

[57] ABSTRACT

A machine for indexing groups of nestable die trimmed articles in a stack of such articles by causing a misregistration of a sheet of preformed articles during a die trimming operation. Such indexing can aid in separating said stack into said groups.

1 Claim, 5 Drawing Figures

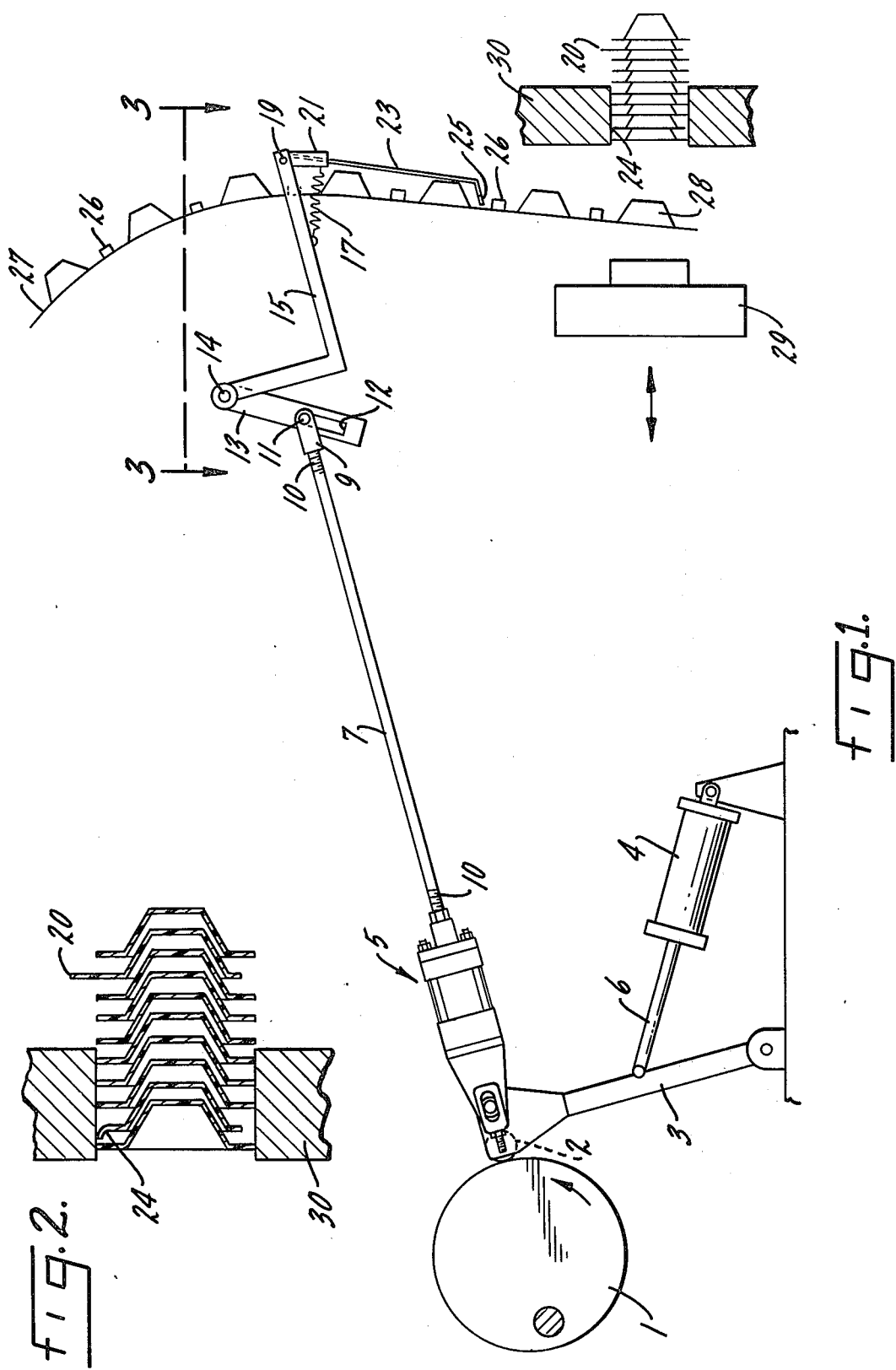

MACHINE FOR INDEXING GROUPS OF NESTABLE TRIMMED ARTICLES IN A STACK

BACKGROUND OF THE INVENTION

1. Field of the Invention

This invention is directed to the field of art involved in die cutting or die trimming of preformed articles from a sheet of such articles.

2. Description of the Prior Art

A problem that often occurs when large quantities of parts are produced with high speed thermoforming equipment is how to separate a predetermined number of die cut members so that they may be packed for shipment. Several methods for solving this problem, to be discussed herein, each involve significant disadvantages as compared to the invention hereinafter disclosed in detail.

One method is to incorporate a ram-like device into the die cutter of a conventional die trimming machine which at a fixed time will force a stack of die trimmed articles (see FIG. 2) through a die so as to cause a distinct separation between one group of die cut articles from another group of such articles. The main problems of this method are that each trim tool requires a set of pusher tooling which may be lost on changing trim tools, and the machinery is subject to mechanical failure.

Another method is to make an identifying mark on selected members prior to die trimming or cutting so that, after trimming in the usual sequence, said selected members will define a group having a desired number of members. In practice, said marking is accomplished by spraying. This process, however, is messy in that it causes parts to stick together.

It is an object of this invention to provide a reliable method and machine for indexing groups of nestable trimmed articles in a stack.

It is an object of this invention to provide a device which is easily adaptable to conventional die cutting machinery.

Other objects of this device will be readily apparent to those skilled in the art once the teachings of this disclosure are applied.

BRIEF DESCRIPTION OF THE INVENTION

In conventional die cutting of a sheet of preformed members, the machinery employed is specifically designed so that said sheet is very accurately registered in each trimming operation. The reasons for this are clear, in that any misregisteration will ruin the item being manufactured with attendent loss in production and possibly of material. A complete change in perspective is required in order to deliberately introduce a means for misregistering said sheet of preformed members.

The practice of this invention will probably be limited to situations where:

1. loss in production is outweighed by the ease of separating a stack into groups of known members, and
2. the misregistered article is (a) in practice, recyclable so as to avoid material loss, (b) somewhat deformable (as hereinafter discussed), and (c) nestable (as hereinafter discussed) so that the consequences of misregistration are visible as the articles leave the trimming die.

"Nestable" is here used to mean the tendency of a group of members to interact so as to align themselves with respect to corresponding features after being die cut.

"Somewhat deformable" is here used to mean the ability of a misregistered die cut article (see FIG. 2, reference numeral 24) to pass through the die while nested in a stack of other nestable die cut articles without damage either to the die, or to any of the die cut or die trimmed articles.

BRIEF DESCRIPTION OF THE DRAWING

FIG. 1 is an overall view of the invention comprising a conventional die cutting machine wherein there is disclosed the inventive improvement.

FIG. 2 is an enlargement of 1 of FIG. 1 showing several trimmed and preformed members in relation to the cutting or trimming die.

DETAILED DESCRIPTION OF THE INVENTION

Figure 3:
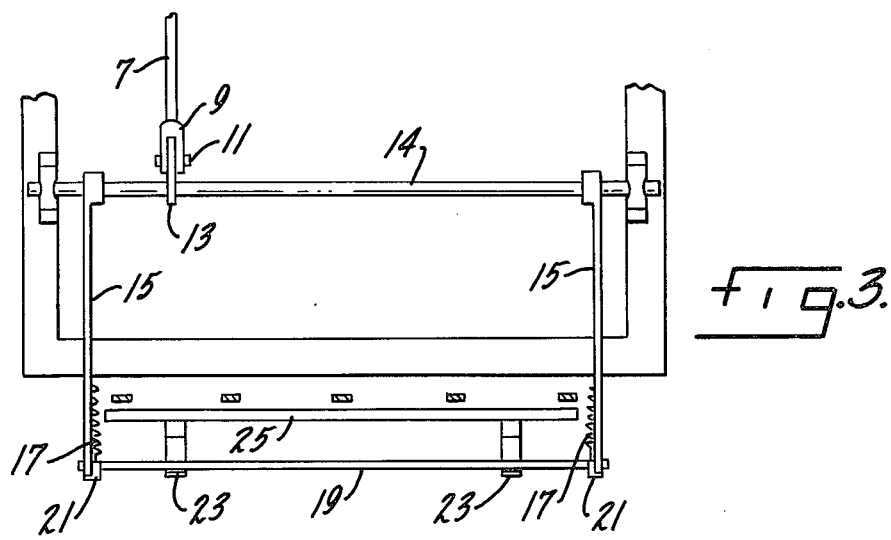
FIG. 3 is a view looking substantially along line 3—3 of FIG. 1.

An example of a conventional die cutting machine modified by the inventive improvement is disclosed in FIG. 1.

A rotatable cam 1 is moved by a motor (not shown). Cam follower wheel 2 or a cam follower means such as a bearing is carried by cam follower arm 3. A pressure cylinder 4 with piston rod 6 attached to cam follower arm 3 maintains cam follower wheel 2 in contact with cam 1. Also attached to cam follower arm 3 is a pneumatic cylinder 5. At one end, actuator arm 7 is attached to cylinder 5 by means of a left handed turn buckle so as to be colinear with piston rod 8 (see FIGS. 4 and 5) of cylinder 5. Actuator arm 7 is attached at the remaining end by a right handed turn buckle to an actuator arm head 9 provided with a hole through which set screw 11 passes. Set screw 11 fixes the position of actuator arm head 9 in slot 12 of lever arm 13. Some rotation about set screw 11 is permitted due to the oscillatory motion of actuator arm 7. Lever arm 13 is fixedly attached to torsion bar 14. Means for moving torsion bar 14 up or down are present but not shown. Also fixedly attached to torsion bar 14 at different positions are lever arms 15. Each end of torsion bar 19 is rotatably mounted to the ends of lever arms 15. Lever arms 21 are fixedly attached to torsion bar 19. Tension springs 17 are attached from lever arms 15 to lever arms 21. Also fixedly attached to torsion bar 19 at different positions are pusher arms 23. At the ends of pusher arms 23 is fixedly attached pusher bar 25.

For purpose of clarity, the operation of an unmodified machine, not containing the inventive improvement of pneumatic cylinder 5, will be considered first.

In FIG. 1, actuator arm 7 is in its furthest position to the right as a result of the position of cam 1. As cam 1 continues to rotate counter-clockwise, cam follower wheel 2 or an equivalent cam follower means, maintained in contact with cam 1 as a result of pressure cylinder 4 and piston rod 6, will begin to move to the left. In the unmodified machine, actuator arm 7 is attached to cam follower arm 3 by means of a pin, bushing, and turn buckle. As cam follower wheel 2 or an equivalent cam follower means moves to the left on the circumference of cam 1, actuator arm 7 also moves to the left. The movement to the left by actuator arm 7 causes lever arm 13 to move to the left in a clockwise rotation about the axis of torsion bar 14. Since both lever arm 13 and 15 are fixedly attached to torsion bar 14, a clockwise rotation by lever arm 13 causes a clockwise rotation by lever arm 15, which in turn causes torsion bar 19 to move downward. Pusher arms 23 fixedly attached to torsion bar 19 will also move downward and because of the tension springs 17, will rotate clockwise about the axis of torsion bar 19 until pusher bar 25 comes in contact with the sheet of preformed articles 27. The springs 17 will maintain pusher bar 25 in contact with a surface of preformed articles 27. In FIG. 1, pusher bar 25 is above index projections 26 and as pusher bar 25 moves downward it will first engage projections 26 and then move the sheet of preformed articles 27 downward. The distance pusher bar 25 will move downward will depend upon two factors:

1. how far to the left actuator arm 7 moves; and
2. the mechanical advantage present from lever arms 13 and 15. "Mechanical advantage" is here intended to mean the ratio of the distance moved by pusher bar 25 to the coupled distance moved by actuator arm 7. For example when actuator arm 7 moves 1 inch, the pusher bar 25 moves approximately 4 inches. The mechanical advantage is 4 to 1.

In summary, as actuator arm 7 moves to the left, pusher bar 25, as a result of a pivoting means comprising lever arms 13 and 15, torsion bar 14 and pusher arm 23, moves downward engaging projections 26 and moving the sheet of preformed articles 27 downward. Conversely, as actuator arm 7 moves to the right, pusher bar 25 moves upward. The pusher bar is designed so that as it moves upward it will not engage any projections on the sheet of preformed parts 27 so as to move the sheet upward. The machine has several adjustments such as turn buckles 10 having right and left handed threads and slot 12 in lever arm 13 which, for a given cam, permit final adjustment of precise movements of the pusher bar 25 with respect to its highest and lowest positions. Clearly, with respect to pusher bar's 25 lowest position, a preformed article 28 will be properly registered in die 30 so that upon cutting or trimming by die cutter 29, the part will be properly trimmed. With respect to pusher bar's 25 highest position, it should be sufficiently above index projections 26 so that upon movement downward pusher bar 25 will engage index projections 26. In essence, as actuator arm 7 moves to the right and then to the left, a pivoting means causes pusher bar 25 to move upward and then downward, respectively.

In a preferred embodiment of the inventive improvement, pneumatic cylinder 5, comprises: two yokes 40, provided with holes 46 and attached to the body 42 of pneumatic cylinder 5; two ports 43 and 43' for injecting or venting air or other gas under pressure, respectively into or from the hollow body 42 of pneumatic cylinder 5; a piston rod 8; a piston head 44 attached to the end of piston rod 8 being provided with a hole through which a yoke pin 48 passes and in which yoke pin 48 is held in a fixed position by set screw 47; and adjustable set screws 50 with setting nuts 51 to control the maximum free movement of yoke pin 48 within hole 46. Yoke pin 48 passes through a forked piece 53 of the cam follower arm 3 provided with two holes and bushings 41 therein. Bushings 41 permit some rotation of yokes 40 with respect to cam follower arm 3.

Figure 4:
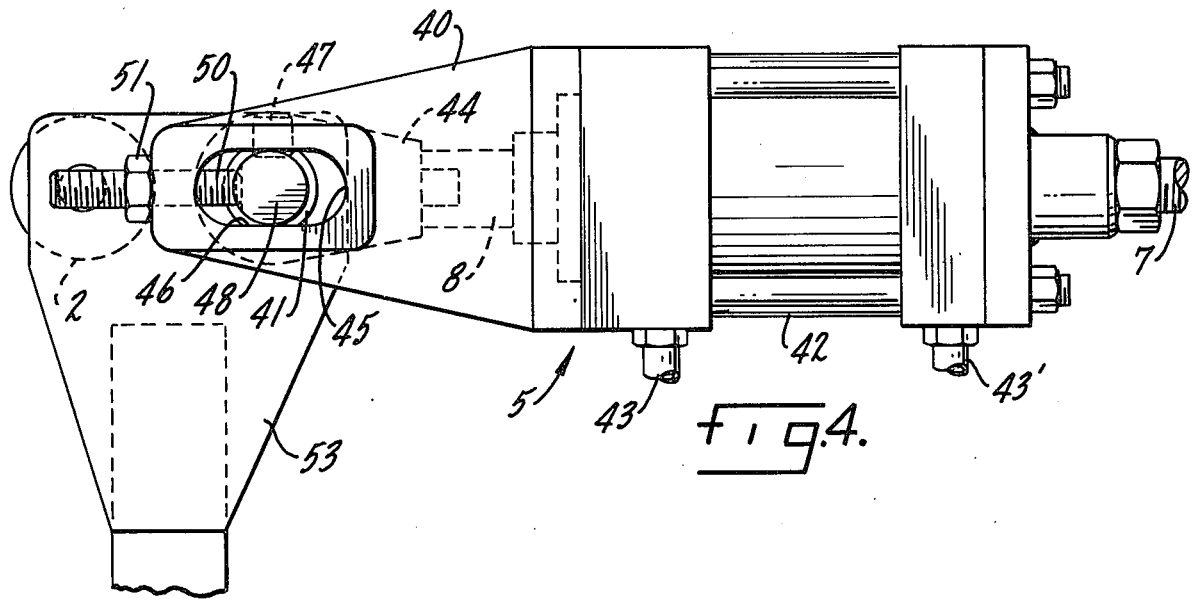
FIGS. 4 and 5 are side and top elevation views of the pneumatic cylinder 5 which modifies a conventional die cutting machine such as manufactured by Brown Machine Division of Koehring Company, Beaverton, Mich.
Figure 5:
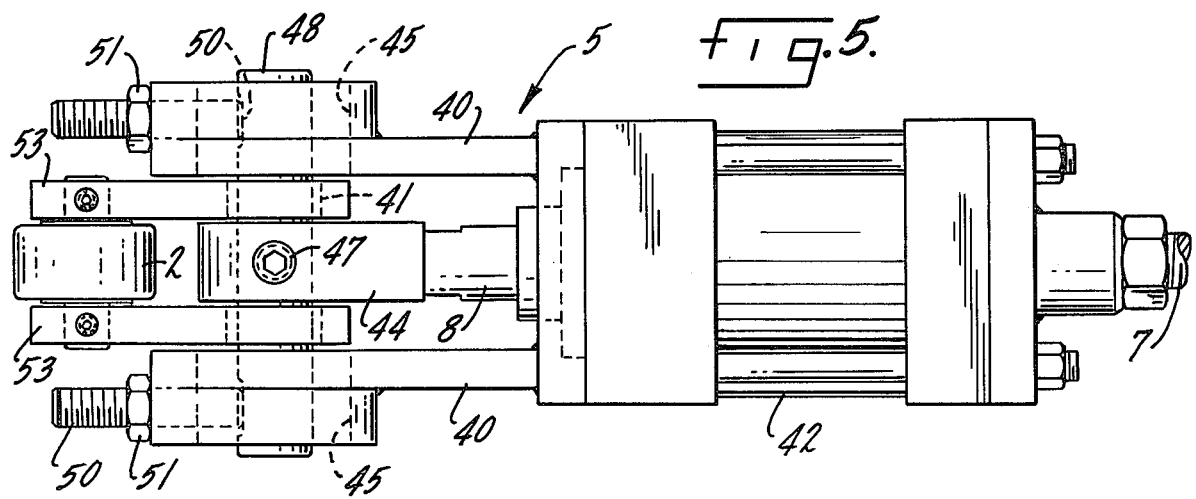

The operation and effect of cylinder 5 is best understood by imagining that the position of cam follower wheel is fixed. In FIGS. 4 and 5, piston rod 8 is in its maximum position outside of cylinder body 42. As air is injected into port 43 and vented from port 43', piston rod 8 will move into cylinder 42. Since the cam follower wheel is presumed fixed, and the distance between the cam follower wheel 2 and the set screw 47 is fixed because of the yoke pin 48 and bushings 41, therefore, as piston rod 8 moves into cylinder body 42, the apparent effect is for cylinder body 42 to move to the left. A movement of cylinder body 42 to the left causes yokes 40 to move to the left. The surfaces 45 of holes 46 opposite yoke pin 48 will move to the left until contact occurs between said surfaces 45 and yoke pin 48. Conversely, assuming that piston rod 8 is maximally inserted into cylinder 42 with yoke pin 48 in contact with surfaces 45, as air is injected into port 43' and removed from port 43, piston rod 8 will be urged from cylinder body 42. Recalling that since cam follower wheel 2 is assumed to be fixed, therefore, set screw 47, piston head 44, piston rod 8, and yoke pin 48 are also all fixed. The apparent effect of piston rod 8 being urged from cylinder body 42 is that cylinder body 42 moves to the right. Yokes 40 attached to cylinder body 42 also move to the right. Surfaces 45 move to the right and away from yoke pin 48. Movement to the right continues until set screws 50 come in contact with yoke pin 48. It is clear that if yoke pin 48 is in contact with set screws 50, then piston rod 8 must be in its most expelled position.

In summary, assuming cam follower wheel 2 as fixed, the effect of inserting piston rod 8 into cylinder body 42 is to move cylinder body 42 to the left. Conversely, the effect of expelling piston rod 8 is to move the cylinder to the right.

The effect of pneumatic cylinder 5 when incorporated into a conventional die cutting machine as shown in FIG. 1 can be readily understood by first assuming that cam 1 is not rotating and that cam follower wheel 2 is always in contact with the surface of said cam, and then considering the effect of piston rod 8 moving either into or out of cylinder body 42. The effect of inserting piston rod 8 into cylinder body 42 is to move cylinder body 42 to the left. This will in turn cause actuator arm 7 to move to the left. A movement to the left by actuator arm 7 will result in a downward movement of pusher bar 25. Alternatively, the affect of expelling piston rod 8 out of cylinder body 42 is to move both cylinder body 42 and actuator arm 7 to the right. A movement to the right by actuator arm 7 will result in an upward movement of pusher bar 25. In sum, an additional movement is being superimposed upon that motion which occurs when the cylinder 5 is not in operation or not incorporated into the machine.

In practice, there are two modes of operation. The first mode is to set the die cutting machine to properly register a sheet of preformed articles when piston rod 8 is maximally expelled from cylinder body 42, i.e., when yoke pin 48 is in contact with set screws 50. The second mode is to set the die cutting machine to properly register a sheet of preformed articles when piston rod 8 is maximally inserted in cylinder 42, i.e., when yoke pin 48 is in contact with surfaces 45.

In either mode, the machine will operate as follows: a sensing device or counter (not shown) keeps track of the number of articles die cut from a sheet of such articles, after a predetermined number of such articles have been produced; a signal is sent activating valves (not shown) to a source of compressed air or other gas (not shown) which results in air being forced into port 43 (43') and out of port 43' (43). The cam 1 rotates uninterruptedly throughout. A cycle beginning at the starting point shown in FIG. 1, comprises piston rod 8, under the influence of compressed gas or air, being inserted (expelled) into (from) cylinder 42 at a rate fast enough to be fully inserted (expelled) before cam 1 rotates 180 degrees beyond said starting point. Piston rod 8 remains inserted (expelled) until starting point shown in FIG. 1 is again reached; and then piston rod 8 is expelled (inserted) completely from (into) cylinder 42 before cam 1 has rotated 180° beyond said starting point. In either mode, percent rate of insertion or expulsion is more than 2 times faster than percent rate of the cam's 1 rotation.

The critical feature of either mode involves the motion of pusher bar 25 as a result of both the pneumatic cylinder 5 and cam 1. In the first mode, when a 180° rotation of cam 1 beyond the starting point of FIG. 1 is complete, piston rod 8 must be maximally inserted, and the position of pusher bar 25 in this case will be lower than when piston rod 8 is maximally expelled. Since the machine was arranged so that pusher bar 25 will properly register a sheet of preformed articles when piston rod 8 is maximally expelled, the new position of piston rod 8 maximally inserted must result in a misregistration. The effect of this misregistration is shown in FIG. 2, numeral 20. In the first mode, an elongated lip 20 is produced at the top. Due to the nesting property of the die cut articles, this elongated lip 20 is clearly visible. In the second mode, when a 180° rotation of cam 1 beyond the starting point of FIG. 1 is complete, piston rod 8 must be maximally expelled. The position of pusher bar 25 at this moment will be higher than when properly registering a sheet of preformed articles to be cut or trimmed. The effect (not shown) is an elongated lip at the bottom rather than the top.

A more general conceptualization of this invention is to consider the cylinder 5 as changing reproducibly and at will the overall length of actuator arm 7, as measured between the center of cam follower wheel 2 and set screw 11. A piston and cylinder is an example of one means for causing a change in overall distance of actuator arm 7.

A more general form of this invention is to introduce a means for reproducibly and at will changing:
1. the lengths of lever arms 13 or 15 or actuator arm 7, or
2. changing the position of at least one pivot point such as around set screw 11, or
3. changing the position of torsion bar 14 or any other change readily apparent to a man of skill in the relevant art so as to cause a misregistration of a sheet of preformed articles upon being die cut or trimmed.

Another example of this invention involves an improvement to a conventional die-cutting machine which contains a means for moving a sheet from which preformed articles are die-cut. The improvement in said machine is to introduce a means for causing at fixed times a movement of said sheet which results in a misregistration of said sheet with respect to a trimming or cutting die. In effect, an additional movement is being super-imposed on that movement caused by an unmodified conventional die-cutting machine. One method, used by conventional die-cutting machines is to move a set of preformed articles into position to be die-cut, is that of a conveyor belt. A misregistration of said sheet of preformed articles will result from superimposing an additional movement on the motion of said conveyor belt.

Another example of this invention involves a conventional die-cutting machine which comprises:
a. means for engaging a sheet of preformed articles, such as pusher bar 25;
b. an actuator arm 7;
c. a cam follower means 2 such as a wheel or bearings, etc.;
d. a cam 1;
e. a pivoting means to cause said means for engaging to shift between predetermined positions when said actuator arm 7 is moved under the influence of said cam. The improvement in this machine, which will induce a misregistration of said sheet of preformed articles during the die-cutting step, is a means for changing the length of said actuator arm 7 as measured from the center of said cam follower means to the end of said actuator arm 7 which is attached to a pivoting means. The changes in length of actuator arm 7 occurs after a predetermined number of articles have been die-cut.

A more general example of this invention involves the deliberate alteration of some physical relationship in a conventional die cutting machine which can reproducibly cause a misregistration. An example of an alteration in some physical relationship has been discussed above in terms of a change in the overall length of actuator arm 7. It is clear that a similar misregistration can be induced by permitting movement of set screw 11 in slot 12. Similarly, a misregistration can be induced to incur by changing the position of torsion bar 14. Torsion bar 14 is in effect a pivot point around which lever arms 13 and 15 move. Other pivot points whose movement would result in misregistration are readily apparent to a man of average skill in this art.

An example of a specific means for changing the length of actuator arm 7 is:
a. a pneumatic cylinder,
b. a piston within said cylinder,
c. a means for controlling the amount of movement of said piston in said pneumatic cylinder, and
d. a means for moving said piston within said cylinder; wherein said pneumatic cylinder and said piston are part of said actuator arm so that motion of said piston with respect to said cylinder changes the length of said actuator arm 7. "Part of" is here intended to mean incorporated into the actuator arm 7.

A more narrow description of an example of a means for changing the length of actuator arm 7 is:
a. a pneumatic cylinder,
b. a piston rod 8 of said cylinder parallel to said actuator arm,
c. one or more yokes 40 attached to an outside surface of said pneumatic cylinder so as to be parallel to and spaced radially apart from said piston rod and said yokes being each provided with a hole,
d. a yoke pin fixedly attached to said piston rod and extending radially therefrom so as to be contained within each of said holes, and
e. a means for moving the piston within said cylinder; wherein said pneumatic cylinder and said piston are attached between said cam follower wheel and said actuator arm or incorporated into said actuator arm 7 so that motion of said piston with respect to said cylinder changes said length of said actuator arm.

The specific embodiments herein described illustrate this invention but variations thereof by use of known equivalents according to the teaching afforded by this disclosure should be deemed within the scope of this invention.

We claim:
1. In a conventional die cutting machine comprising:
   1. a means for engaging a sheet of preformed articles,
   2. an actuator arm,
   3. a cam follower means,
   4. a cam,
   5. a pivoting means to cause said means for engaging to shift between predetermined positions when said actuator arm is moved under the influence of said cam, the improvement which comprises:
   a. a pneumatic cylinder,
   b. a piston rod of said cylinder parallel to said actuator arm,
   c. a plurality of yokes attached to a surface of said pneumatic cylinder so as to be parallel to and spaced radially apart from said piston rod and said yokes being provided with adjustable sized holes,
   d. a yoke pin fixedly attached to said piston rod and extending radially therefrom so as to be contained within said adjustable sized holes, and
   e. a means for moving the piston within said cylinder; wherein said pneumatic cylinder and said piston rod are part of said actuator arm so that motion of said piston rod with respect to said cylinder changes said length of said actuator arm.

* * * * *